United States Patent [19]
Bergkvist

[11] 3,945,129
[45] Mar. 23, 1976

[54] INSTRUMENT FOR THE INDICATION OR CHECKING OF THE ANGULAR POSITION OF AN OBJECT

[76] Inventor: Lars A. Bergkvist, Gottne, 890 26 Moliden, Sweden

[22] Filed: Nov. 13, 1974

[21] Appl. No.: 523,350

[52] U.S. Cl. .................. 33/399; 33/1 N; 33/348; 33/391; 356/169
[51] Int. Cl.² .......................................... G01C 9/12
[58] Field of Search ............ 33/391, 392, 399, 1 N, 33/348; 356/169, 170

[56] References Cited
UNITED STATES PATENTS

| | | |
|---|---|---|
| 1,359,474 | 11/1920 | Wernick .............................. 33/399 |
| 3,145,250 | 8/1964 | Vargady ............................. 356/169 |
| 3,166,624 | 1/1965 | Vargady ............................. 356/169 |
| 3,192,641 | 7/1965 | Jones ................................. 33/399 |

*Primary Examiner*—William D. Martin, Jr.
*Attorney, Agent, or Firm*—Silverman & Cass, Ltd.

[57] ABSTRACT

An instrument for indicating or checking the angular position of an object. A movable part is mounted on a stationary part; said parts have a pattern of equally wide parallel lines separated by interspaces. When the parts overlap in use of the instrument the line patterns form a moire pattern to indicate the angular position of the object.

8 Claims, 9 Drawing Figures

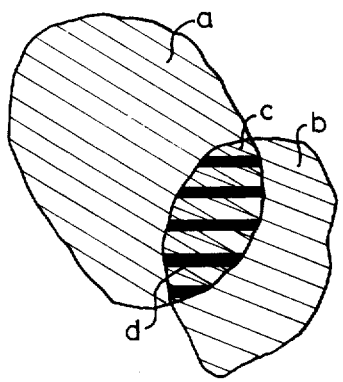
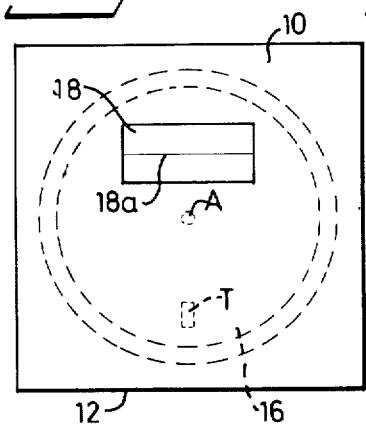
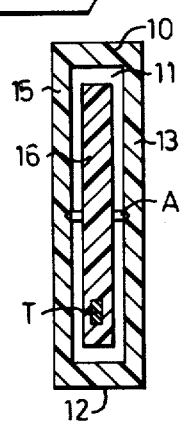
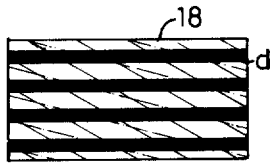
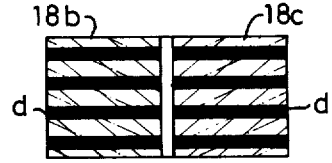
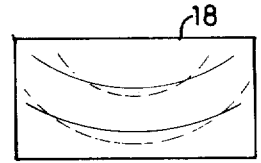
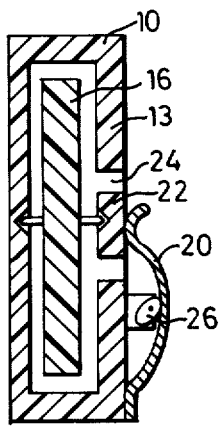
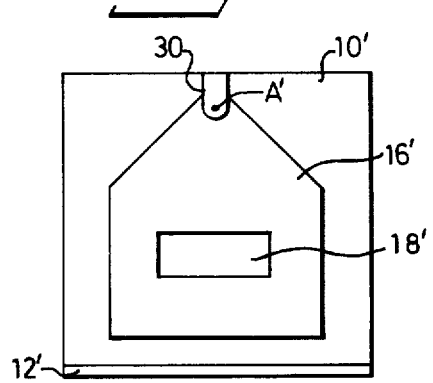
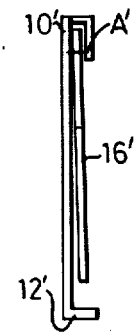

INSTRUMENT FOR THE INDICATION OR CHECKING OF THE ANGULAR POSITION OF AN OBJECT

The present invention relates generally to an angle indication instrument for indicating when a predetermined angle between two directions is present, and especially to an indication device for indicating when a line or a plane is perpendicular to the vertical plane, that is a device which can replace a bubble level.

Bubble levels are generally known in form of transparent closed tubes partly filled with liquid so that a gas bubble is left in the tube. Due to the fact, that the tube is slightly bent (with a great radius of curvature), so that the tube surface which is turned upwards is convex, the gas bubble will become located at a point in the tube, the location of which is dependent on the direction of the tube in relation to the horizontal plane. The tube is placed in a frame structure provided with one or more surfaces, which surfaces can be placed against a surface, the horizontal or vertical location of which is to be determined. When the frame is placed in the right horizontal or vertical position the gas bubble wll register with an index or a marking on the tube.

The known bubble levels are sufficiently satisfactory for many purposes but they have the disadvantage that the reading is not very accurate and furthermore that it is not possible to lock or preserve the angle indication for some further utilization.

The present invention relates to an instrument for the indication or checking of the angular position of an object, comprising a stationary part and a movable part, said movable part being pivoted to said stationary part, and rotatable about an axis which is not coincident with the mass centre of the movable part, and said stationary part having at least one straight edge that can be placed against a surface of said object, said stationary part as well as said movable part having a pattern of equally wide, parallel lines separated by interspaces of substantially the same width as the lines, said interspaces being transparent on at least one of said parts, said parts overlapping each other at least in an area where the line pattern of one of said parts is visible through the interspaces of the line pattern of the other part, and the two line patterns together are forming a moire pattern.

The invention is characterized by the fact, that the width of the lines and interspaces of the line pattern of the movable part differs from the width of the lines and interspaces of the line pattern of the stationary part, whereby the moire pattern will be in the form of lines and interspaces of greater width than the width of the lines and interspaces in any of the line patterns of said parts, and whereby the angular position of the lines and interspaces of said moire pattern provides a very accurate indication of the angular position of said object against which said edge is placed.

In order to obtain an easily readable indication in the form of a further optical pattern, the so called moire effect is utilized, said moire effect being obtained when for example a pair of transparent plates are located one over the other, each of said plates being provided with a pattern of opaque, parallel lines separated by transparent lines or interspaces, which preferably have the same width as the opaque lines. The pitches of the line patterns of the two plates should preferably be slightly different. When the line patterns of the two plates are parallel with each other, a pattern of wider, dark lines appears, said dark lines being separated by interspaces of equal width as said wider lines. Said wider dark lines are parallel with the lines of the line patterns. If the plates with the two line patterns are slightly rotated relative to each other said wider dark lines will also be rotated, and then the wider dark lines will form an angle with the lines of the line patterns of the two plates. Expressed in a simple manner it may be stated that said wider dark lines are rotated at a greater speed than the speed of the relative rotation of the line patterns of the two plates. The angle change of the wider dark lines for a certain change of the angle between the line patterns of the two plates is greatest, when the angle between said line patterns is about ¼ - ½ radian. Mathematical calculations and practical studies have shown this, and it is valid when the line widths (and the equally wide interspaces) of the patterns of the plates differ from each other by about ten or twenty percent.

When the device is intended to be used as a bubble level, the stationary part should have for example a side or an edge intended to be placed against an object, which is to be directed in a horizontal position or the horizontal position of which is to be controlled. The movable part in such a device is rotatably mounted relative to the stationary part and has a centre of mass which is excentric relative to the axis of rotation. By this arrangement the movable part will always be located in a certain position relative to the vertical direction. The stationary part and the movable part have line patterns. When the stationary part is located with said side or edge in a horizontal position, a predetermined moire pattern is visible, which indicates that said side edge or the stationary part is horizontal.

In a further embodiment of the invention the device is provided with locking means for locking the movable part to the stationary part. This can be done for example when a measurement is made under such conditions, that the device can not be seen during said measurement. Such conditions can be present in for example narrow shafts and deep wells.

In order to provide a better understanding of the invention some embodiments of the same will be described with reference to the attached drawing.

FIG. 1 is a schematic view showing the production of moire patterns.

FIG. 2 is a front view of a device according to the invention which can be used as a bubble level.

FIG. 3 shows a cross section of the device according to FIG. 2.

FIG. 4 shows an indication in the device according to FIG. 2.

FIG. 5 shows another indication in the device according to FIG. 2.

FIG. 6 shows schematically a line pattern in form of bent lines.

FIG. 7 shows schematically locking means for the movable part of the device.

FIGS. 8 and 9 show a simple embodiment of the invention.

FIG. 1 shows how a moire pattern is produced, a indicates a part of a first transparent plate with a line pattern in form of straight lines which are separated by interspaces with substantially the same widths as the lines. The lines can for example have a thickness of 0.5 mm and be separated by interspaces of a thickness of 0.5 mm. For the sake of clarity the lines are indicated by very thin lines. b indicates a part of a second transparent plate having a pattern of straight lines separated by interspaces, which have substantially the same widths as the lines. The widths of the lines and the interspaces of the part $b$ differ from the widths of the lines and the interspaces of the part $a$. The width of the lines and the interspaces of the part $b$ can for example be 0.4 mm. Also the lines of part $b$ are indicated by very thin lines for the sake of clarity. The two parts a and b overlap each other in an area c, where the lines of the line patterns of the parts $a$ and $b$ form an acute angle. In the area c a moire pattern is produced which is indicated by very thick lines $d$. The lines $d$ are straight when the parts $a$ and $b$ have line patterns with straight lines. The lines d are separated by interspaces, which are wider than the interspaces between the lines of the patterns of the parts $a$ and $b$. The thick moire lines d form angles with the lines of the line patterns of the parts $a$ and $b$. Said angles are greater than the angle between the lines of the line patterns of the parts $a$ and $b$.

It is to be noted, that a moire pattern can be produced also between patterns of bent lines. In the following an exampke of the use of such a pattern of bent lines will be described.

FIG. 2 shows a device according to the invention and suitable to be used instead of a bubble level. It comprises a stationary part 10, which for example has the shape of a rectangular or a quadratic housing. Said housing 10 has, as can be seen in FIG. 3, an inner cavity 11 having the shape of for example a circular, cylindrical space. In the cavity 11 the movable part is mounted. It has the shape of a circular disc 16. It is mounted in such a way, that in can very easily be rotated about a horizontal rotational axis A (when the housing 10 is kept in a substantially vertical position when used). The rotational axis may for example have the shape of pins with small diameters fastened to the movable part, said pins being inserted in recesses, for example in journal stones ("rubies") fastened to the stationary part.

The disc 16 is preferably circular and provided with plane parallel sides. It can be made of, for example, a transparent plastic material. In the disc there is inserted a metallic part with high density in such a way, that the mass centre T of the disc 16 will not be coincident with the rotational axis A. Therefore, the disc will be rotated by gravity to a well defined angular position when the device is used.

The housing 10 is provided with a window 18, which preferably is situated above the rotation axis A in the way shown in FIG. 2, when one of the edges 12 or 14, respectively, of the stationary part or housing 10 is placed against a horizontal or vertical object or surface. A moire pattern is to be visible through the window 18, and, therefore, the walls 13 and 15 of the window 18 of the housing 10 as well as the part of the disc 16 which is in use is visible through the window 18 must be transparent.

The inner side surface of that wall of the stationary part which is provided with the window 18, for example the wall 13, has one of the line patterns which form a moire pattern. The other of the two line patterns is situated on that side of the disc 16, which is adjacent to said wall 13 with the window 18.

When the housing 10 is placed with its edge 12 or 14 against a horizontal or vertical object, respectively, an easily recognizable moire pattern will be visible in the window as described above. In order to obtain an accurate indication, this moire pattern must change very much when the direction of the edge 12 or 14 is given only a small inclination to the horizontal or vertical direction, respectively. The most simple way is to provide the patterns of straight lines on the inside of the housing and on the disc 16 opposite to the window 10. The patterns should be in form of lines (separated by interspaces) parallel to the edge or side 12 for both patterns, when the edge 12 is accurately horizontal and the disc 16 is located in the position determined by gravity force. As is described above a moire pattern will be visible in the window 18 in form of thick horizontal moire lines. These moire lines will be inclined relative to the horizontal direction, if the side or edge 12 comes into a position that differs from the horizontal direction. The determination whether the moire lines are horizontal or not is obtained in the following way. Auxiliary lines 18a are drawn on the window 18, said auxiliary lines being exactly parallel with the moire lines when the side 12 is horizontally located. The auxiliary lines 18a can have another colour than the lines of the line patterns, which are preferably black.

As has been noted above the degree of change of the inclination of the moire lines when the angle between the lines of the two patterns is changed is greater, when said lines form an angle which is about ¼ -½ radian. FIG. 4 shows how this can be utilized by arranging the line patterns of the disc and the housing wall with an inclination as is indicated by the very thin continuous and dash-and-dot lines. The continuous lines indicate the direction of the lines of the pattern of the inside of the wall 13, and the dash-and-dot lines indicate the direction of the lines of the pattern on the disc 16. The inclinations of the lines of the two line patterns is chosen in such a way, that the greatest relative angle change of the moire lines d is obtained, when said lines are horizontal (the case shown in FIG. 4). In the way already described one or more auxiliary lines can be provided on the window which are horizontal when the edge 12 is horizontal and which correspond to the auxiliary line 18a shown in FIG. 2, but which is not shown in FIG. 4 for the sake of clarity.

FIG. 5 shows a part of a further embodiment of the invention with a different mode of indication in the window 18. In this case the window is divided into two window parts 18b and 18c, which are situated side by side and separated by a vertical interspace. The direction of the lines of the patterns of the wall 13 and the disc 16 visible through the window parts 18b and 18c are indicated by continuous and dash-and-dot lines, respectively, as in FIG. 4. The patterns of the two window parts are reflected images of each other. The directions of the lines are chosen in such a way, that the moire lines $d$ will be horizontal in the window part 18b as well as in the window part 18c, when the edge 12 is horizontal. When the location of the edge 12 is changed the moire lines $d$ will be rotated in opposite directions in the window parts 18b and 18c and hereby a very clear indication is obtained.

It is not absolutely necessary that the lines of the patterns of the wall 13 and the disc 16 are straight. They can alternatively be bent (for example circle lines) and separated by uniformly wide interspaces. FIG. 6 shows schematically patterns of circle lines with different radies of curvature situated on the wall 13 and the disc 16, respectively. Also in this case one of the patterns is indicated by very thin continuous lines and the other pattern by dash-and-dot lines.

Other forms of line patterns can of course be used and are easily realized by anyone skilled in the art. Therefore they are not described in detail here.

In most cases a device as described above can be made with a sufficient precision with regard to the line patterns, which are located on the wall 13 and the disc 16, for example by a printing process, so that a moire pattern of, for example, straight lines is obtained, when the edge 12 is horizontal. If desired, one or both of the line patterns may be adjustable. One simple way of doing this is to apply the patterns on thin, transparent, plastic discs. The device is placed in a jig or some other device for locating the stationary and the movable part in positions corresponding to the horizontal position of the edge 12. Thereafter, said thin discs are located in such positions, that the desired moire pattern is produced, and thereafter the discs are fixed by glueing in said positions. Also within the scope of the invention there may be devices provided with for example adjustment screws for the adjustment of the line pattern of the wall 13.

In order to reduce the friction in the bearings which carry the disc 16 the cavity 11 can be partly or completely filled with a liquid, so that the weight of the disc 16 is partly or completely carried by the liquid.

The device according to the invention can be used for determining if an object has a side or the like, which is horizontal or vertical. By using certain accessories, such as an adjustable angle instrument or beveling rule, which are easy to understand and develope, placed against the edge or side 12, an arbitrary predetermined angle can be examined and measured.

If the side to be examined of the object is not easily accessible, so that a direct reading is impossible, the device can be provided with locking means. By said locking means the disc 16 can be locked in the position it has, when the side or edge 12 is placed against the side of the object, the angle of which should be checked or measured. Such locking means can be constructed in various ways, and the construction shown in FIG. 7 is only an example. In FIG. 7 the disc 16 is provided with a pair of pins inserted in recesses in the stationary part 10. One recess is for example fixed in the back wall of the housing 10, and the other recess is located in a member 22, said member 22 being carried by the front wall 13 of the housing 10 by a leaf spring or a membrane 24. Thereby the member 22 can be pressed against the end of the pin, whereby the pins are locked and will keep the disc 16 in the angular position it has at the moment when the pins are locked. The member 22 is influenced by a plate spring 20 of suitable shape and attached to the housing 10, which spring will press the member 22 inwards so that the pins will be locked. A small can member 26 is mounted on the housing 10 and is adapted to be flotated about an excentric axis. By turning said cam member, the spring 20 can be lifted out of engagement with the member 22 and then the disc 16 can rotate freely. The cam member 26 can be operated either by a handle arranged in the device and/or from a remote position, for example by a Bowden cable or by electromagnets. When the angular position of the object which is not easily accessible is checked, the side or edge 12 is placed against the object and the disc 16 is released and will be rotated to an angular position determined by gravity force. Thereafter the disc 16 is locked and the device can be taken out from the inaccessible position so that the indication in the window 18 can be read.

Many various kinds of locking means can be used. The important thing is that the angular position of the disc 16 relative to the housing 10 is kept unchanged during the locking process.

In FIGS. 8 and 9 a very simple embodiment of the invention is shown. FIG. 8 is a front view and FIG. 9 is a side view. The details of the device of FIGS. 8 and 9 corresponding to the details of FIGS. 2 and 3 have the same reference numbers followed by an apostrophe. The device comprises a stationary part with the reference number 10' having the shape of a quadratic or rectangular plate of for example a transparent plastic material and being provided with a rib 12' corresponding to the side 12. By a member 30 the movable part 16' is suspended and easily rotatable about a rotational axis A'. Said member 30 is integral with the plate 10' at that edge or said plate, which is opposite to the rib 12', which is formed by a bent-out portion of one of the edges of the plate 10'. The movable part 16' has the shape of a rectangle, the upper corners of which are removed and which has a shape reminding of a house gable. The movable part 16' can be made of a uniformly thick, transparent plastic material. It will take the position shown in FIG. 8 by the influence of gravity, when the plate 10' is vertical and the rib 12' is horizontal. The indication window with the reference number 18' is in this case located in the movable part 16'. One of the line patterns is located in the window on that side of the movable part 16', which is adjacent to the plate 10'. The other line pattern is drawn on said plate 10' on that side which is adjacent to the part 16'. The line patterns can be of some of the kinds described in connection with FIGS. 2–6. The arrangement should of course be such, that an easily recognizable, optical moire pattern is produced, when the rib 12' is horizontal and the part 16' is located in a position which is determined by the gravity force.

The embodiment now described is useful as a very simple and easy instrument when the requirements of accurateness are not too high and there is no need for locking the rotatable part.

The invention is not limited to the embodiments shown and described, but the invention comprises all changes and modifications within the scope of the attached claims. Furthermore, the device according to the invention can be provided with optical means in form of lenses, prisms and the like in order to facilitate the reading of the optical moire pattern.

What we claim is:

1. An instrument for indicating or checking the angular position of an object comprising, a stationary part and a movable part, said movable part being pivotally connected to said stationary part and rotatable about an axis which is not coincident with the mass center of the movable part, said stationary part having at least one straight edge for placement against a surface of said object, said stationary part and said movable part having a pattern of equally wide parallel lines, said lines being separated by interspaces of substantially the same width as the lines, said interspaces being transparent on at least one of said parts, said parts overlapping each other at least in an area where the line pattern of one of said parts is visible through the interspaces of the line pattern of the other part, the two line patterns adapted together to form a moire pattern, the width of both the lines and interspaces of the line pattern of one of said parts being smaller than the width of both the lines and interspaces of the line pattern of the other of said parts, whereby the moire pattern will be in the form of lines and interspaces of greater width than the width of the lines and interspaces in any of the line patterns of said parts such that the angular position of the lines and interspaces of said moire pattern provides a very accurate indication of the angular position of said object against which said edge is placed.

2. An instrument as claimed in claim 1 in which the angular position of the lines of said stationary part in relation to the angular position of said straight edge and in relation to the angular position of said straight edge and in relation to the angular position of the lines of said movable part when the mass center of said movable part is moved to the angular position defined by gravity, when said straight edge of the stationary part is strictly horizontal or vertical, is such that the lines of said moire pattern are horizontal.

3. An instrument as claimed in claim 2 in which, when the instrument is in said position of the stationary and movable parts, the lines of said both parts form an acute angle to said side or edge of said movable part, the size of said angle being about between ¼ to ½ radian.

4. An instrument as claimed in claim 1 in which the stationary part is a housing formed of transparent plastic material, the housing having a cavity of generally circular cylindrical configuration, said movable part being mounted in the cavity and being formed as a circular homogeneously thick disc, said disc having a central axis retained in bearings about which the disc is rotatable, and a portion of said disc having a higher density than the remainder thereof, whereby the mass center of the disc is located at a distance from said center axis.

5. An instrument as claimed in claim 4 in which said cavity in the housing is provided with liquid for reducing the weight load on the bearings of the disc.

6. An instrument as claimed in claim 4 in which the high density part of the disc is formed of metal and the metal part is located at a distance from the center of the disc.

7. An instrument as claimed in claim 1 including locking means to lock the movable part relative to the stationary part in the angle location which is present when the locking is effected.

8. An instrument as claimed in claim 7 in which said movable part has bearing means, said locking means being operable to influence the bearing of the movable part by locking the bearing means relative to the stationary part.

* * * * *